(12) United States Patent
Evans

(10) Patent No.: US 6,979,045 B1
(45) Date of Patent: Dec. 27, 2005

(54) WINDOW SYSTEM FOR CONVERTIBLE MOTOR VEHICLES

(76) Inventor: Edwin Evans, 850 Desert Storm Apt. 103 - Bldg. 13, Las Vegas, NV (US) 89110

(*) Notice: Subject to any disclaimer, the term of this patent is extended or adjusted under 35 U.S.C. 154(b) by 0 days.

(21) Appl. No.: 10/035,969

(22) Filed: Nov. 9, 2001

(51) Int. Cl.[7] .............................................. B60J 7/00
(52) U.S. Cl. ............. 296/107.07; 160/179; 160/DIG. 2
(58) Field of Search ....................... 296/147, 146.14, 296/148, 107.07, 97.21, 146.2, 146.16, 97.2, 296/97.3; 160/DIG. 8, DIG. 2, DIG. 18, 160/179, 106, 89; 454/136

(56) References Cited

U.S. PATENT DOCUMENTS

| | | | |
|---|---|---|---|
| 2,002,596 A * | 5/1935 | Westrope ..................... 296/138 |
| 2,404,807 A * | 7/1946 | Kubatzky ..................... 160/91 |
| 2,717,437 A | 9/1955 | De Mestral |
| 2,788,291 A | 4/1957 | Stertz |
| 2,933,797 A | 4/1960 | De Mestral |
| 3,009,235 A | 11/1961 | De Mestral |
| 3,091,494 A * | 5/1963 | Cohen .................. 296/107.07 |
| 3,718,528 A | 2/1973 | Bergstrom |
| 3,753,458 A * | 8/1973 | Lazarek ....................... 160/354 |
| 3,953,566 A | 4/1976 | Gore |
| 4,220,298 A * | 9/1980 | Willis ....................... 244/129.5 |
| 4,513,548 A * | 4/1985 | Parker .......................... 52/202 |
| 4,544,195 A * | 10/1985 | Gunn ....................... 296/26.11 |
| 4,558,634 A | 12/1985 | Oshiro et al. |
| 4,616,456 A * | 10/1986 | Parker .......................... 52/202 |
| 4,663,495 A | 5/1987 | Berman et al. |
| 4,759,581 A * | 7/1988 | McNamee .................. 296/97.7 |
| 4,766,918 A * | 8/1988 | Odekirk ....................... 52/2.23 |
| 4,815,784 A | 3/1989 | Zheng |
| 4,867,502 A * | 9/1989 | Sylvester et al. ........... 296/161 |
| 4,900,081 A | 2/1990 | Lee |
| 4,993,471 A * | 2/1991 | Golden .................. 160/370.21 |
| 5,024,262 A | 6/1991 | Huang |
| 5,040,455 A | 8/1991 | Doi et al. |
| 5,094,151 A | 3/1992 | Bernard |
| 5,301,736 A * | 4/1994 | Wu ....................... 160/370.21 |
| 5,375,901 A * | 12/1994 | Agosta et al. ......... 296/146.14 |
| 5,423,589 A * | 6/1995 | Pank ..................... 296/146.15 |
| 5,454,615 A * | 10/1995 | Schnepf ..................... 296/95.1 |
| 5,489,136 A * | 2/1996 | Pank ..................... 296/146.15 |
| 5,544,671 A | 8/1996 | Phillips |
| 5,678,882 A * | 10/1997 | Hammond ............... 296/146.1 |
| 5,702,147 A * | 12/1997 | Essig ......................... 296/106 |
| 5,728,632 A * | 3/1998 | Sugie .......................... 442/43 |
| 5,732,978 A * | 3/1998 | Tunnell, IV ................. 283/34 |
| 5,921,571 A * | 7/1999 | Bell ........................... 280/204 |
| 6,070,274 A * | 6/2000 | van der Sleesen ............. 2/456 |
| 6,106,051 A * | 8/2000 | Miskowic ............. 296/100.09 |
| 6,164,714 A | 12/2000 | Gleason et al. |
| 2003/0019591 A1 * | 1/2003 | Christian ..................... 160/89 |

* cited by examiner

*Primary Examiner*—Patricia L. Engle
(74) *Attorney, Agent, or Firm*—Ellis & Venable PC

(57) ABSTRACT

The present invention is a window system for convertible motor vehicles that incorporates the use of woven fabric made from vinyl coated polyester yarn in such a way that it (1) reduces the "greenhouse effect" that occurs when the soft-covering system is on the vehicle, whether the window is open or not, (2) reduces the harmful unwanted effects the sun can have on the driver, the passengers and the interior of the passenger compartment, (3) reduces the airflow that occurs when the vehicle is driven with one or more flexible windows down, (4) makes it more difficult for a passerby to see into the passenger compartment, while still allowing an occupant to see the outside from inside the passenger compartment and (5) protects the flexible window from being scratched or otherwise damaged.

17 Claims, 3 Drawing Sheets

WINDOW SYSTEM FOR CONVERTIBLE MOTOR VEHICLES

FIELD OF THE INVENTION

The present invention relates generally to the field of convertible soft-covering systems for motor vehicles, and particularly to window systems for use on a motor vehicle with a convertible soft-covering system.

BACKGROUND

One of the purposes of operating a motor vehicle with a convertible soft-covering system is to be able to modify the soft-covering system to fit to a variety of situations. Weather permitting, the soft-covering system can be removed (or retracted) so that the user of the motor vehicle can directly enjoy the sunshine and the outside air. If the weather is inclement on the other hand, the soft-covering system can be put on the vehicle so that the user is protected from unwanted elements like rain, snow or the sun.

Accordingly, a soft-covering system should be able to adapt to a variety of situations while also remaining (1) easy to use (2) easy to modify, and (3) effective at keeping undesirable elements (like rain and snow, for example) out of the vehicle's passenger compartment while allowing desirable elements (like fresh air, for example) into the vehicle's passenger compartment. Information relevant to address this problem can be found in U.S. Pat. No. 5,094,151 (Bernard), U.S. Pat. No. 5,040,455 (Doi et al.), U.S. Pat. No. 4,663,495 (Berman), U.S. Pat. No. 4,558,634 (Oshiro), U.S. Pat. No. 3,953,566 (Gore), U.S. Pat. No. 3,718,528 (Bergstrom). Each one of these referenced items, however, suffers from one or more of the following disadvantages.

A flexible window of the typical soft-covering system must be either opened or closed, it cannot be opened "a little bit" like the ordinary retractable windows found on non-convertible vehicles. The typical flexible window is secured to the soft-covering system by a zipper, requiring that the window cannot be adjustably lowered, but must be either "open" or "closed." The typical flexible window can only be opened by unzipping the flexible window and folding it into the passenger compartment. The typical flexible window can only be closed by zipping up the zipper that secures the flexible window to the soft-covering.

On some hot days, it is desirable to travel with the soft-covering system on the vehicle to shield the passenger compartment from direct sunlight. As a consequence, if the flexible windows are closed, the temperature of passenger compartment can reach very high temperatures, at least in part because of the "greenhouse effect" caused by the sunlight coming through the translucent flexible windows.

Opening the flexible window does not solve the problem of direct sunlight. Moreover, leaving the flexible windows open when the vehicle is parked makes it easier for a passerby to see into the passenger compartment. Likewise, leaving the flexible window open also allows the sun to prematurely weather the interior of the passenger compartment. In addition, leaving the window open can expose the driver and the passenger to the unwanted effects of the sun, other elements and insects.

Opening the flexible window also creates excessive airflow though the passenger compartment when the vehicle is moving. The excessive airflow makes it uncomfortable for the passengers and driver because of the high wind and noise created by the excessive airflow.

In addition, the flexible window of the typical soft-covering system is exposed to the outside and can be easily scratched by branches and other objects, particularly when the vehicle is driven "off-road." Over time, the flexible window can become so scratched that it becomes difficult for the driver and passengers to see though the flexible window.

What is needed is a component for a soft-covering system that (1) reduces the "greenhouse effect" that occurs when the soft-covering system is on the vehicle, whether the window is open or not (2) reduces the harmful unwanted effects the sun can have on the driver, the passengers and the interior of the passenger compartment, (3) reduces the airflow that occurs when the vehicle is driven with one or more soft windows down, (4) makes it more difficult for a passerby to see into the passenger compartment, while still allowing an occupant to see the outside from inside the passenger compartment, and (5) protects the flexible window from being scratched or otherwise damaged.

SUMMARY OF THE INVENTION

It is an object of the present invention to provide a component for a soft-covering system that (1) reduces the "greenhouse effect" that occurs when the soft-covering system is on the vehicle, whether the window is open or not (2) reduces the harmful unwanted effects the sun can have on the driver, the passengers and the interior of the passenger compartment, (3) reduces the airflow and/or road noise that occurs when the vehicle is driven with one or more flexible windows either in the up or down position, (4) makes it more difficult for a passerby to see into the passenger compartment, while still allowing an occupant to see the outside from inside the passenger compartment and (5) protects the flexible window from being scratched or otherwise damaged.

The invention is a window system for use on a motor vehicle with a convertible soft-covering system. The three major components of the window system are (1) a flexible window 10, (2) a soft-cover window frame 20, and (3) an insertable screen 30. The flexible window 10 has a first window side 12, a second window side 14 and a window perimeter area 16. The soft-cover window frame 20 has an outside frame side 22 and an inside frame side 24. The insertable screen 30 has a first screen side 32 and a second screen side 34. To utilize this invention, the first screen side 32 of the insertable screen 30 may be matingly coupled to the window perimeter area 16 on the second window side 14 of the flexible window 10. In addition the second screen side 34 may be matingly coupled with the inside window frame 24.

The invention significantly reduces the amount of sunlight that can enter the passenger compartment when the flexible window is both in the open and the closed position. Accordingly, the invention significantly reduces the greenhouse effect on the passenger compartment of the motor vehicle. This invention reduces the harmful unwanted effects the sun can have on the driver, the passengers and the interior of the passenger compartment. This invention reduces the airflow and noise in the passenger compartment when the flexible window is down and the vehicle is moving and still allows the driver and the passengers to see out the window opening. This invention also reduces a passerby's ability to see into the passenger compartment when the vehicle is parked and prevents a passerby from simply reaching into the passenger compartment and taking something when the flexible window is down. This invention also protects the flexible window from being scratched or otherwise damaged.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase.

DESCRIPTION OF PREFERRED EMBODIMENTS

Figure 1:
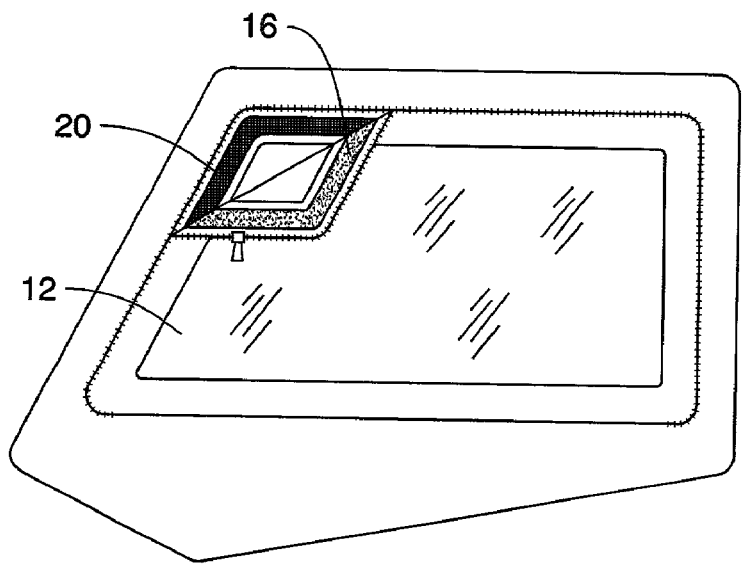
FIG. 1 is a view of an embodiment of the window system without the insertable screen.

The invention is a window system for use on a motor vehicle with a convertible soft-covering system. The three major components of the window system are (1) a flexible window 10, (2) a soft-cover window frame 20, and (3) an insertable screen 30. The flexible window 10 has a first window side 12, a second window side 14 and a window perimeter area 16. The soft-cover window frame 20 has an outside frame side 22 and an inside frame side 24. The insertable screen 30 has a first screen side 32 and a second screen side 34. In the preferred embodiment, the first screen side 32 of the insertable screen 30 is matingly coupled to the window perimeter area 16 on the second window side 14 of the flexible window 10. In addition the second screen side 34 is matingly coupled with the inside window frame 24.

Many methods of coupling the elements of this invention are known. It is preferred to use hook and loop type fasteners to matingly couple elements of the invention. The hook and loop type fastener may be a nylon material made with both a surface of tiny hooks and a complimentary surface of clinging pile, used in matching strips that can be pressed together or pulled apart for easy fastening and unfastening. One example of the hook and loop type fasteners is sold commercially under the trademark VELCRO® by Velcro Industries, B.V. In this regard, U.S. Pat. No. 3,009,235 and related patents might be of interest. The most preferred hook and loop type fastener has a sticky backside and is between one-half of an inch and one inch wide. One example of this type of fastener is sold commercially under the trademark VELCRO® STICKY BACK® by Velcro Industries, B.V. Other methods of matingly coupling two elements together (e.g., zippers, buttons, snaps, magnets or magnet strips) may also be used.

The hook and loop type fasteners can be attached to the elements of the invention by sewing or gluing or preferably both sewing and gluing. Sewing can be accomplished using marine grade thread. It is preferable to use thread sold commercially by Saunders Thread Company that has been spun with fiber sold commercially under the trademark NOMEX® by E.I. du Pont de Nemours and Company. It has been found that clear vinyl glues will work as will many other glues. It is preferred to use glue sold commercially under the trademark by Quick Grab, Inc.

It is most preferable to use hook and loop type fasteners already secured to the soft-covering system. For example, the Chrysler Corporation's Original Equipment Manufactured (OEM) soft-covering system (top and doors) for the convertible motor vehicle sold under the trademark JEEP® between the years 1990–2002 already has hook and loop type fasteners sewn into the inside frame side 24 and the second window side 14 of the door. Accordingly it is preferred to matingly couple the insertable screen 30 to the inside frame side 24 and the second window side 14 of Chrysler Corporation's Original Equipment Manufactured (OEM) soft-covering system for the convertible motor vehicle sold under the trademark JEEP® to the hook and loop type fasteners already connected to the soft-covering system.

Figure 6:
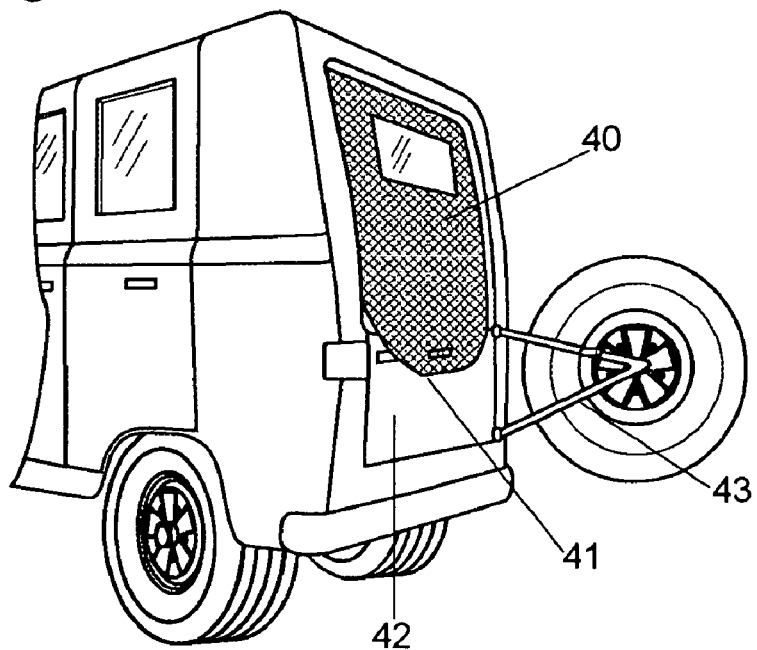
FIG. 6 is a view of an embodiment of the window system where the spare tire gate is open.
Figure 6A:
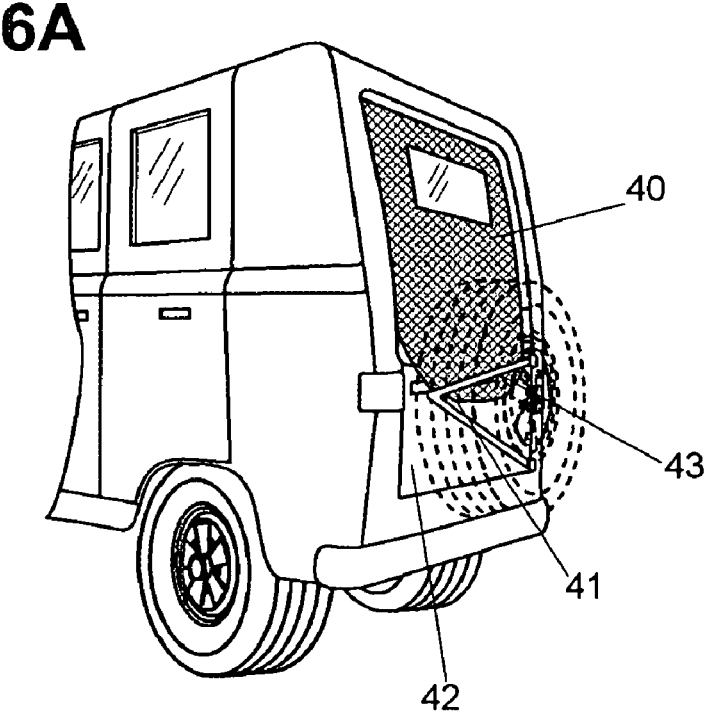
FIG. 6A is a view of an embodiment of the window system showing the bottom side of the insertable screen pinched between the spare tire gate and the back gate of the vehicle.

Not all sides of the insertable screen need be matingly coupled. As previously described, the bottom side of the back window on Chrysler Corporation's Original Equipment Manufactured (OEM) soft-covering system for the convertible motor vehicle sold under the trademark JEEP® can be matingly coupled by using magnetic strips on the bottom side of the back window and matingly coupling the bottom side to the back gate of the vehicle. Alternatively, the bottom side 41 of the back window 40 can also be secured by pinching the bottom side 41 between the spare tire gate 43 and the back gate 42 when closing the spare tire gate 43, as seen in FIGS. 6 and 6A.

The insertable screen should be woven in a manner to substantially block sunlight while allowing a person inside the passenger compartment to view the outside. For example, it is preferred that the insertable screen be a woven fabric of vinyl coated polyester yarn capable of screening at least some sunlight. While many products may work, a preferred example is a product sold by Phifer Wire Products, Inc. under the trademark Phifer SUNTEX®. On its website, Phifer claims that Phifer SUNTEX® product "offers excellent outward visibility and good ventilation" and blocks over 75% of the sun's rays.

Figure 4:
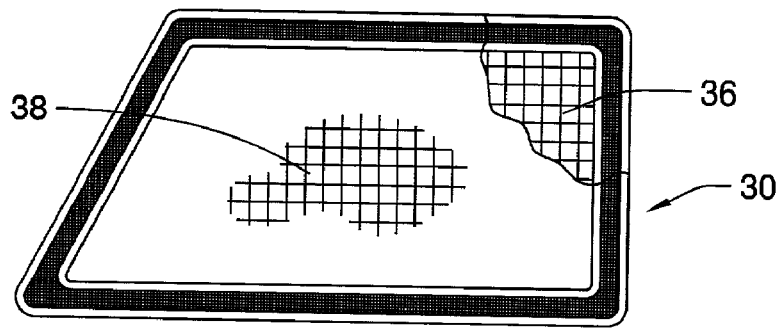
FIG. 4 is a view of an embodiment of an insertable screen having an inner screen and an outer screen, with the strands of fabric of the inner screen and the strands of fabric of the outer screen being aligned with each other.
Figure 5:
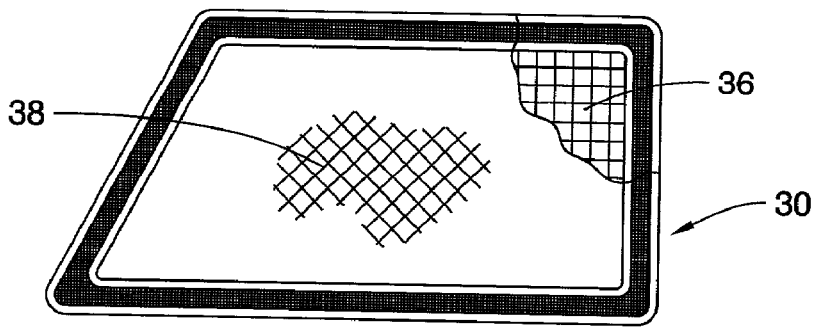
FIG. 5 is a view of an embodiment of an insertable screen having an inner screen and an outer screen, with the strands of fabric of the inner screen rotated approximately 45 degrees from the strands of fabric of the outer screen.
Figure 2:
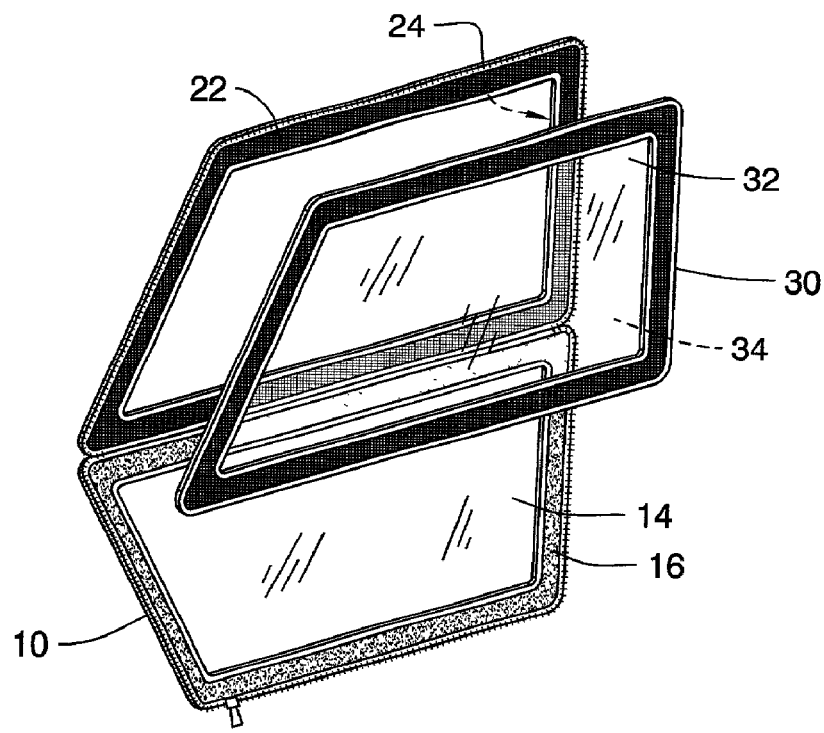
FIG. 2 is a view of an embodiment of the window system having an insertable screen.
Figure 3:
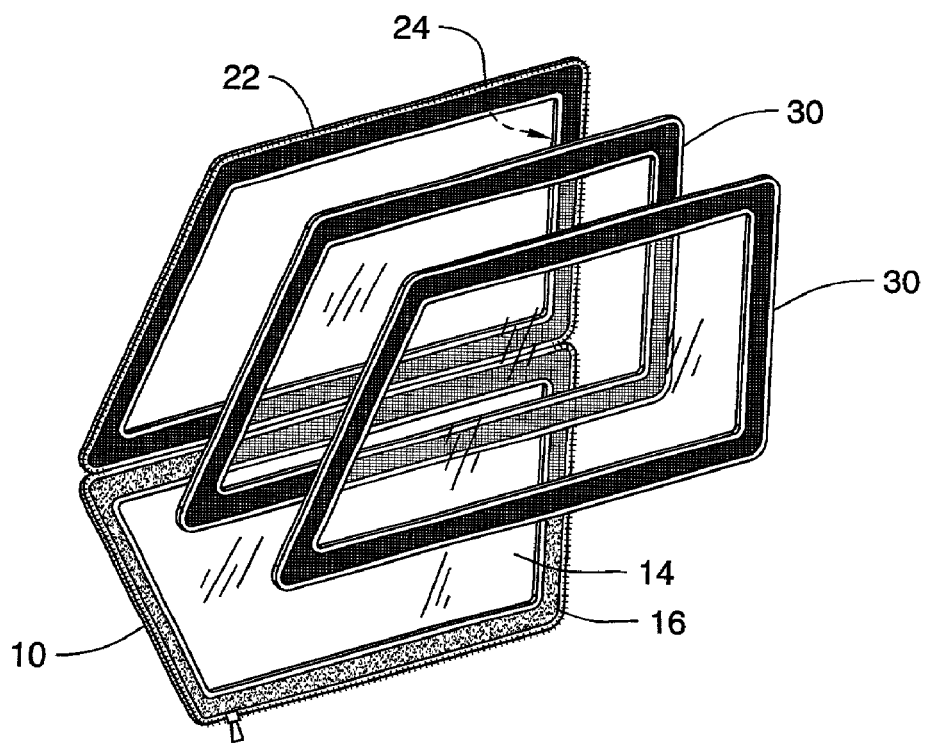
FIG. 3 is a view of another embodiment of the window system having at least two insertable screens.

In an alternative embodiment, the insertable screen 30 further comprises two screens, an inner screen 36 and an outer screen 38. It is preferred to rotate the inner screen 36 with respect to the outer screen 38 so that the strands of fabric of the inner screen 36 and the outer screen 38 are not aligned with each other. See FIGS. 4 and 5. It is most preferred that the strands of fabric of the inner screen 36 are rotated approximately 45 degrees from the strands of fabric of the outer screen 38. See FIG. 5.

In another alternative embodiment, one or more insertable screens 30 may be matingly coupled to each other before being matingly coupled to the window perimeter area 16 on the second window side 14 of the flexible window 10 and the inside window frame 24. The capability of using one or more insertable screens provides flexibility in the amount of protection available for differing conditions.

This invention significantly reduces the greenhouse effect on the passenger compartment of the motor vehicle by reducing the amount of sunlight entering the passenger compartment regardless of whether the flexible window is up or down. This invention also reduces the airflow and noise in the passenger compartment when the flexible window is down and the vehicle is moving while allowing the driver and the passengers to see out the window opening. This invention also reduces the ability of a passerby to see into the passenger compartment when the vehicle is parked and prevents a passerby from simply reaching into the passenger compartment and taking something when the flexible window is down.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A window system for use on a passenger compartment of a motor vehicle with a convertible soft-covering system, the window system comprising:
   a flexible window of the convertible soft-covering system having a first window side, a second window side and a window perimeter area,
   a soft cover window frame of the convertible soft-covering system having an outside frame side and an inside frame side, and
   an insertable screen having a first screen side and a second screen side and a bottom side,
   wherein the window perimeter area on the second window side matingly couples with the first screen side, and the second screen side matingly couples with the inside frame side of the soft cover window frame of the window system for use on the passenger compartment.

2. The window system of claim 1 wherein the window perimeter area on the second window side matingly couples with the first screen side using hook and loop type fasteners and the second screen side matingly couples with the inside frame side of the soft cover window frame using hook and loop type fasteners.

3. The window system of claim 1 wherein the insertable screen is made of a woven vinyl coated fabric.

4. The window system of claim 1 wherein the insertable screen blocks sunlight in an amount between 55 percent and 95 percent of sunlight.

5. The window system of claim 1 wherein the insertable screen blocks approximately 75 percent of sunlight.

6. The window system of claim 1 wherein the insertable screen further comprises an inner screen and an outer screen.

7. The window system of claim 6 wherein the inner and outer screens are made of a woven vinyl coated fabric.

8. The window system of claim 6 wherein the inner and outer screens block sunlight in an amount between 55 percent and 95 percent of sunlight.

9. The window system of claim 6 wherein the inner and outer screens block approximately 75 percent of sunlight.

10. The window system of claim 6 wherein the inner screen is rotated with respect to the outer screen so that the strands of fabric of the inner screen and the outer screen are not aligned with each other.

11. The window system of claim 10 wherein the strands of fabric of the inner screen are rotated approximately 45 degrees from the strands of fabric of the outer screen.

12. The window system of claim 1 further comprising a spare tire gate and a back gate, wherein the bottom side of the insertable screen is pinched between the spare tire gate and the back gate.

13. The window system of claim 12 wherein the insertable screen is made of a woven vinyl coated fabric.

14. The window system of claim 1 further comprising a second insertable screen having a third screen side and a fourth screen side, wherein the second screen side matingly couples with the third screen side, and the fourth screen side matingly couple with the inside frame side of the soft cover window frame.

15. The window system of claim 14 wherein the insertable screen is made of a woven vinyl coated fabric.

16. A window system for use on a motor vehicle with a convertible soft-covering system, the window system comprising:
   a flexible window having a first window side, a second window side and a window perimeter area,
   a soft cover window frame having an outside frame side and an inside frame side, and
   an insertable screen having a first screen side and a second screen side and a bottom side,
   a spare tire gate and a back gate,
   wherein the window perimeter area on the second window side matingly couples with the first screen side, and the second screen side matingly couples with the inside frame side of the soft cover window frame and wherein the bottom side of the insertable screen is pinched between the spare tire gate and the back gate.

17. The window system of claim 16 wherein the insertable screen is made of a woven vinyl coated fabric.

* * * * *